Jan. 20, 1970    H. J. SHAFER    3,490,607
RAILWAY CAR SHOCK ABSORBER
Filed Jan. 4, 1967    3 Sheets-Sheet 1

INVENTOR.
HOMER J. SHAFER
BY Hamilton & Cook
ATTORNEYS

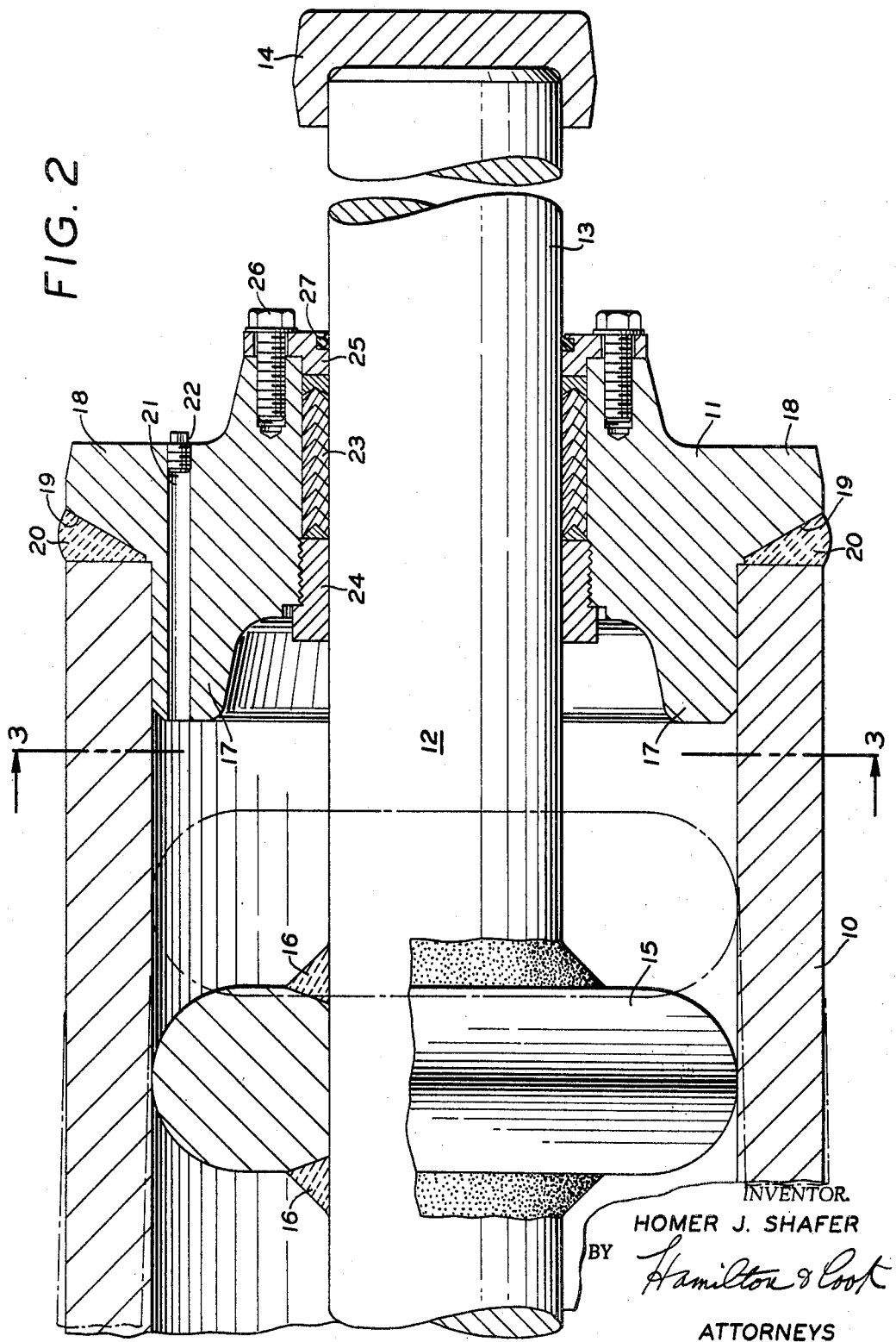

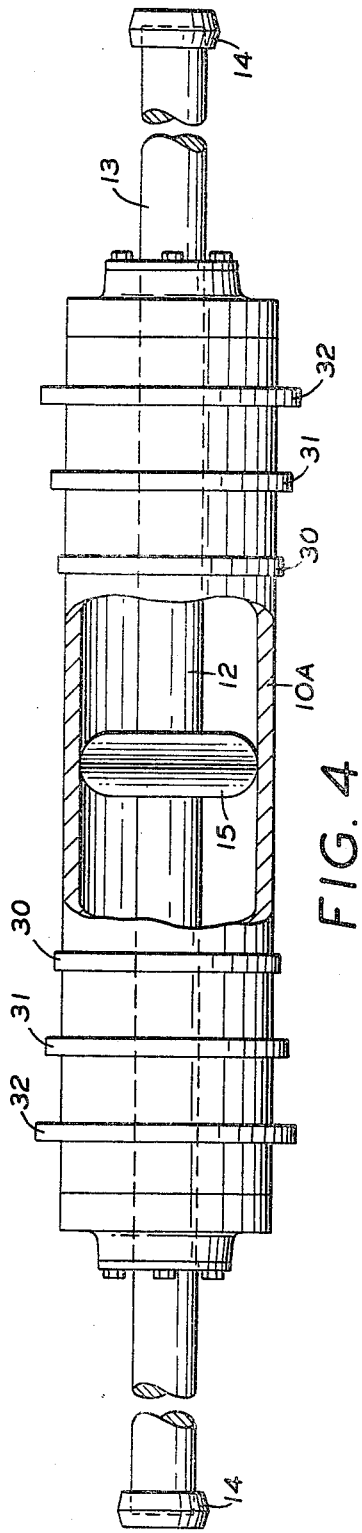
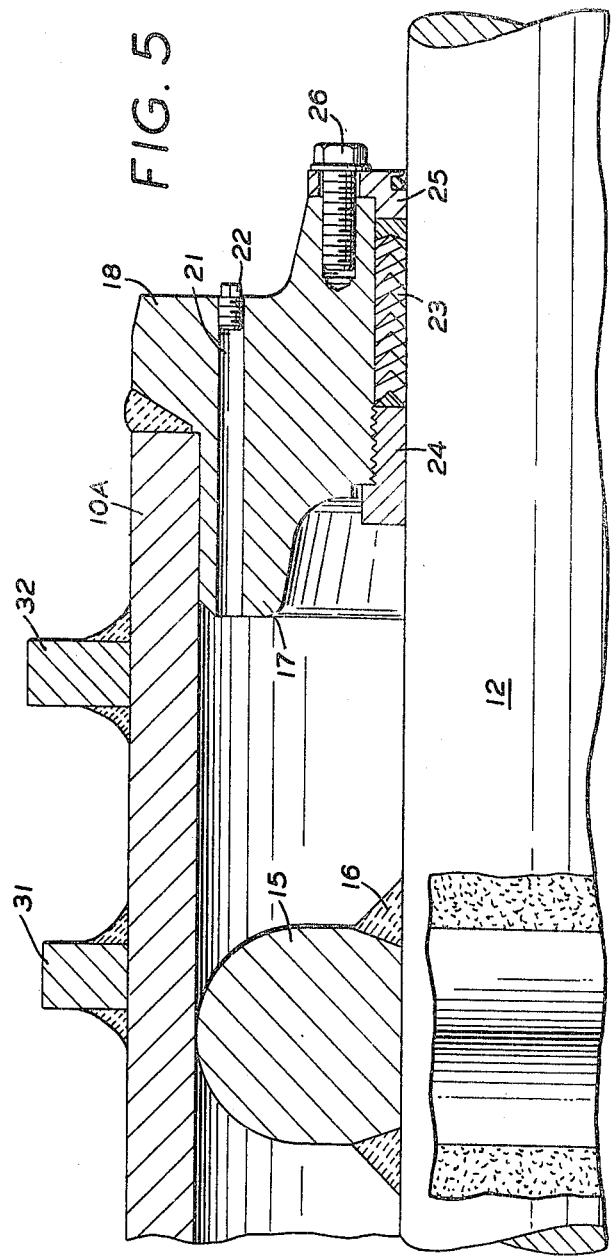

United States Patent Office 3,490,607
Patented Jan. 20, 1970

3,490,607
RAILWAY CAR SHOCK ABSORBER
Homer J. Shafer, 2300 Park Ave. W.,
Mansfield, Ohio 44906
Filed Jan. 4, 1967, Ser. No. 607,236
Int. Cl. B61g 9/08, 9/12; B60g 11/26
U.S. Cl. 213—43
2 Claims

ABSTRACT OF THE DISCLOSURE

A cushioning apparatus having a hydraulic cylinder is attached to the coupler of one car and adapted to receive the impact of the coupler from another car. The head or end members are rigidly secured to the cylinder by welding and the cylinder wall is of such thickness as to be capable of outward bowing under pressure, momentarily to increase the clearance between the periphery of the piston and the cylinder wall.

The invention relates generally to cushioning devices particularly adapted to absorb the shocks applied to the couplers of railway cars.

BACKGROUND OF THE INVENTION

In certain prior constructions of which I am aware, the cylinder heads are bolted to the cylinder and the internal diameter of the cylinder is tapered slightly from the largest diameter midway of the heads to produce progressively decreasing clearance around the piston as it moves toward one or the other of the heads. Such a construction is shown, for example, in U.S. Patent No. 3,110,367.

In these railway car shock absorbers, the pressures built up within the cylinder as the piston approaches the head may be well in excess of 5000 p.s.i. and the pressure at impact may be two or three times as great. Under such pressures the connecting bolts will permit radial expansion of the cylinder adjacent the head in the order of 1/16 inch in diameter, which greatly detracts from the desired progressive cushioning effect by allowing the hydraulic fluid to flow by the piston too rapidly as it moves toward one or the other of the heads. Thus, the tendency is to increase the thickness of the cylinder wall to resist radial expansion of the cylinder. Further, the connecting bolts themselves require increased thickness of the cylinder wall at the ends of the cylinder. Certain other prior constructions utilize check valves to regulate the flow of the hydraulic fluid from one end of the cylinder to the other as the piston moves.

Another disadvantage of these prior bolted constructions is that they require O-ring seals between the cylinder and the heads, and when the expanded end portions of the cylinder contract as the internal cushioning pressures are relieved, the O-ring seals tend to become pinched or distorted and lose their sealing efficiency, resulting in leakage of the hydraulic fluid.

It is an object of the present invention to provide an improved welded piston and cylinder construction which overcomes the disadvantages of prior cushioning devices for railway cars.

More specifically, it is an object to provide an improved construction which does not require progressively tapering the internal diameter of the cylinder.

Another object is to provide an improved welded construction which eliminates the need for seals between the heads and the cylinder wall, and which maintains a fixed internal diameter at the heads while permitting radial expansion or bowing of the cylinder between the heads under cushioning pressure.

A further object is to provide an improved welded construction which minimizes the required thickness of the cylinder wall throughout its length.

A still further object is to provide an improved welded construction which is self-regulating with respect to the flow of the hydraulic fluid as the piston moves under shock loads.

These and other objects are accomplished by the improved construction shown in the accompanying drawings and hereinafter described in detail. Variations and modifications in structure are intended to be within the scope of the appended claims.

SUMMARY OF THE INVENTION

The invention comprises a hydraulic piston and cylinder cushioning device having the end members of the cylinder continuously welded throughout their peripheries to the cylinder, and the cylinder wall being of such thickness as to expand radially between its ends under high internal pressure to increase the clearance between the piston and cylinder, said clearance progressively decreasing as the piston moves toward either end, thereby cushioning the shock.

BRIEF DESCRIPTION OF THE DRAWINGS

FIG. 2 is an enlarged partial longitudinal section thereof, showing the piston approaching one of the heads during a cushioning stroke.

FIGS. 4 and 5 are views similar to FIGS. 1 and 2, respectively, showing a modified construction.

DESCRIPTION OF THE PREFERRED
EMBODIMENT

Figure 1:
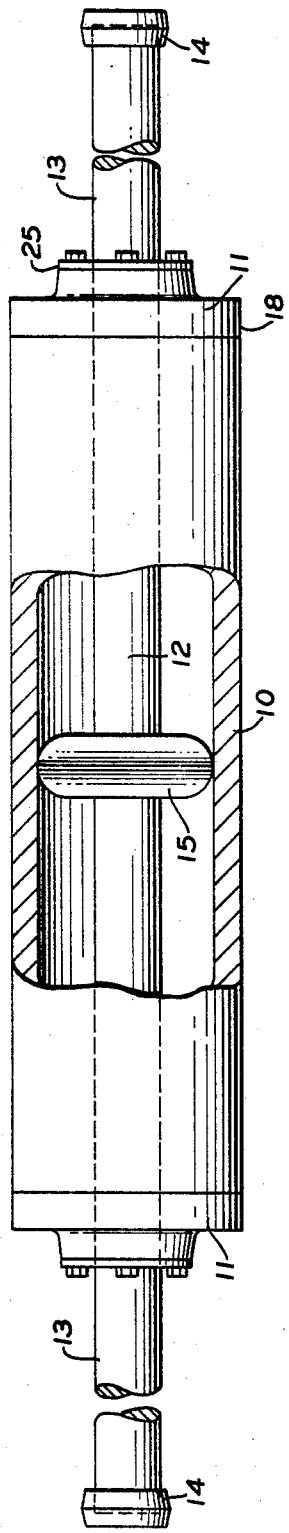
FIG. 1 is an elevational view of a preferred embodiment of the invention, part of the cylinder being broken away.
Figure 3:
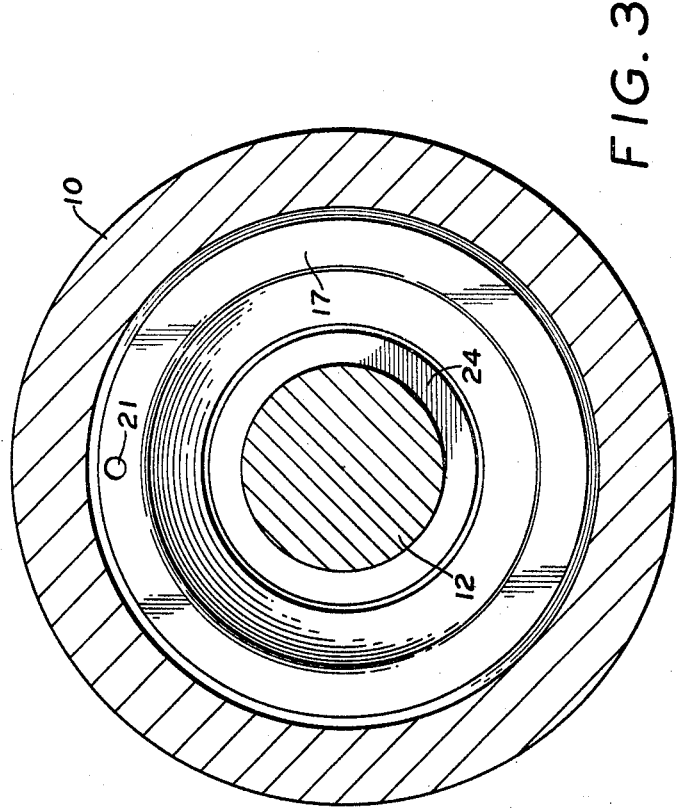
FIG. 3 is a cross-sectional view on line 3—3 of FIG. 2.

The hydraulic piston and cylinder construction shown in FIGS. 1–3 includes a cylinder 10 of suitable length to cushion the shock of impact imparted to the coupler of one car from another. The cylinder 10 has its ends closed by heads 11, and a piston rod 12 extends axially through the cylinder and the heads and projects beyond both heads, as indicated at 13.

The cylinder is mounted on the under-frame of one car and the piston rod is engaged with the coupler in such manner as to receive the shock of impact imparted from another car as the cars are coupled. Preferably, impact caps 14 are mounted on the projecting ends of said piston rod.

The piston rod 12 has mounted thereon an annular piston 15 which is preferably welded continuously to the piston rod around the periphery thereof, as indicated at 16 in FIG. 2. Normally, when the piston is stationary within the cylinder, a working tolerance of say .005″ is maintained between the periphery of the piston and the internal circumference of the cylinder.

The heads 11 preferably have annular peripheral surfaces 17 fitting snugly within the ends of the cylinder 10, and the outer ends of the surfaces 17 terminate in annular flange portions 18 preferably having substantially the same outer diameter as the cylinder wall. The interior annular shoulders 19 of flange portions 18 are preferably inclined to form V-grooves with the ends of the cylinder for receiving weldments 20 extending continuously around and forming solid joints between the cylinder and the heads.

The heads 11 may have passageways 21 extending longitudinally therethrough with plugs 22 normally closing them, for the purpose of introducing hydraulic fluid into the cylinder. Between the bores of the heads 11 and the piston rod 12 a series of V packing rings 23 of suitable resilient material may be provided, and the packing rings may be abutted internally by a metal gland ring 24 screwed in the head, and externally by a gland ring 25 secured to the head by a clamping screw 26. The clamping screw may also mount a sealing ring 27 contacting the piston rod 12.

The continuous weldment 20 obviates the necessity for any seal between the heads 11 and the cylinder 10, and at the same time insures a solid connection which will not permit any radial expansion of the cylinder at or immediately adjacent to the heads, when the piston is moved toward the head first by a shock load and then continues progressively against the internal pressure of the hydraulic fluid between the piston and the head. Moreover, the welding operation itself tends to draw or contract the ends of the cylinder around the annular surfaces 17 of the heads, thereby increasing the solidity of the connections.

In performing the welding operation, in order to guard against any misalignment between the heads and the piston rod, a temporary stringer shaft having a diameter snugly fitting the bores of the heads is positioned therein. Also, any stresses introduced into the cylinder by the welding operation are removed by applying internal pressure to the cylinder after welding to relieve the stresses. If desired, a predetermined amount of internal pressure can be introduced into the cylinder to cause it to stretch and bow or expand radially a predetermined amount at the medial portion, said amount decreasing progressively toward the ends to planes where the working tolerance is maintained.

The wall thickness of cylinder 10 is designed to permit a predetermined amount of bowing at its medial portion under the internal pressures which are built up by movement of the piston under shock loads toward one of the heads. The amount of bowing under the maximum shock loads encountered may be such as to temporarily increase the internal diameter of the cylinder at its median portion on the order of .050", from which it decreases progressively toward the heads to a diameter providing a working clearance of .005" around the piston.

Accordingly, it is not necessary to machine an internal taper in the cylinder 10, although it can be provided by pre-stretching, using a predetermined amount of internal pressure, if desired, as previously described. Not only is the cost of machining such a taper eliminated but the amount of metal is greatly reduced by using a much thinner wall than would be required if bolted connections were used.

In operation, as the piston 15 receives a shock load urging it toward one of the heads 11, the impact pressure built up between the head and piston tends to radially expand the cylinder at its medial portion an amount depending upon the amount of impact load. At and adjacent to the heads the cylinder wall is prevented from expanding radially by the weldment 20 and the contraction of the cylinder end portions on the surfaces 17 of the heads. Obviously, as the piston starts from the median point of the cylinder, the greatest radial expansion will occur at the plane farthest away from the head and progressively decreased from there toward the head, to cause a gradual cushioning effect due to the gradual increase in pressure. The bowing effect is indicated by the chain lines in FIG. 2. The cushioning effect is self-regulating without requiring any check valves or the like to regulate the flow of fluid from one end to the other of the cylinder.

Accordingly, by deliberately using a thinner wall section and welded connections contrary to the conventional practice of requiring heavy wall sections to present radial expansion of the ends of the cylinder and to provide for receiving the connecting bolts, I am able to secure unexpected and advantageous results over prior constructions.

In the modified construction shown in FIGS. 4 and 5, a still thinner cylinder wall 10A can be used, because reinforcing rings or fins 30, 31 and 32 of graduated diameters are welded around the cylinder 10 at intervals along its length.

The stiffest rings 32 having the largest outer diameter are welded around the cylinder at positions adjacent to the heads 11 to resist any radial expansion at those points. Likewise, the smallest ring 30 is located nearest the median of the cylinder so as to permit a predetermined amount of radial expansion, while the intermediate ring 31 is designed to permit an intermediate amount of radial expansion. Obviously, the number, size and location of the reinforcing rings can be varied to suit conditions.

I claim:

1. A hydraulic cushioning device comprising a longitudinay cylinder having a constant internal diameter throughout its length, head members closing the ends of said cylinder and having continuous weld connections therewith throughout their peripheries a piston rod exending longitudinally through said cylinder and said heads, a piston on said piston rod within said cylinder and having such diameter as to provide a working tolerance between the piston and cylinder, said cylinder under internal cushioning pressure providing the only orifice between the piston and the interior cylinder wall, the thickness of said cylinder wall being constructed to expand radially under said pressure from a predetermined amount at its medial portion progressively less toward its ends, whereby as the piston is moved toward one end under shock load the predetermined clearance between its periphery and the internal cylinder will progressively decrease.

2. A hydraulic cushioning device comprising a longitudinal cylinder, head members closing the ends of said cylinder and having continuous weld connections therewith throughout their peripheries, a piston rod extending longitudinally through said cylinder and said heads, a piston on said piston rod within said cylinder, said cylinder under internal cushioning pressure providing the only orifice between the piston and the interior cylinder wall, the thickness of said cylinder wall being so constructed as to expand radially under pressure from a predetermined amount at its medial portion progressively less toward its ends, whereby as the piston is moved toward one end under shock load the predetermined clearance between the periphery and the internal cylinder wall progressively decreases, said cylinder having at longitudinal intervals exterior annular fins graduated in size to control the radial expansion of the cylinder wall.

References Cited

UNITED STATES PATENTS

| | | | |
|---|---|---|---|
| 3,053,526 | 9/1962 | Kendall | 267—1 |
| 3,110,367 | 11/1963 | Roberts | 188—96 |
| 3,163,300 | 12/1964 | Settles | 213—8 |
| 3,369,674 | 2/1968 | Carle | 213—43 |
| 3,315,902 | 4/1967 | Pollitz | 267—65 X |
| 3,366,379 | 1/1968 | McNally | 267—65 |

DRAYTON E. HOFFMAN, Primary Examiner

U.S. Cl. X.R.
188—88; 213—8; 267—1, 65